UNITED STATES PATENT OFFICE.

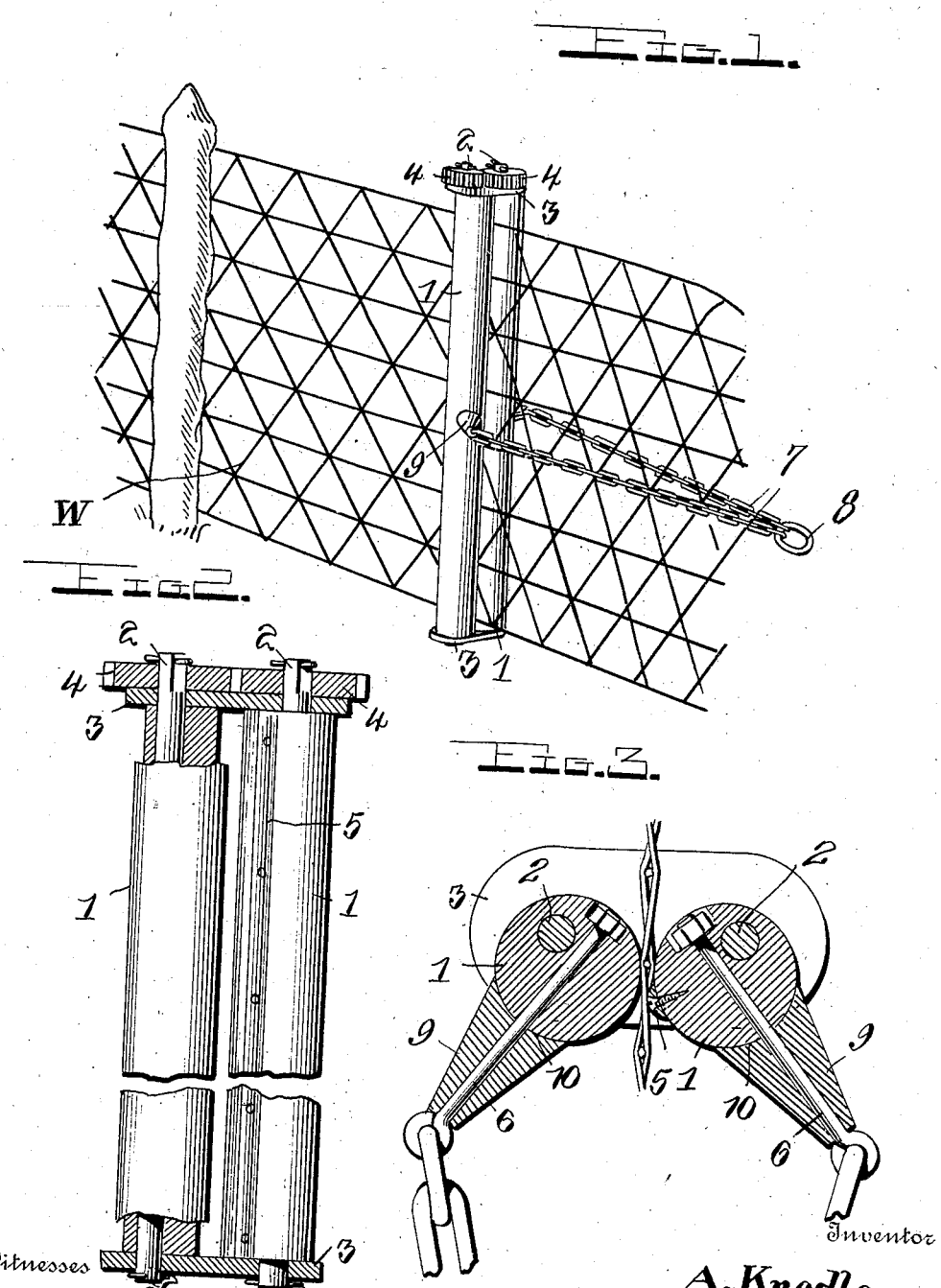

ARTHUR KNODLE, OF LEAF RIVER, ILLINOIS.

WOVEN-WIRE-FENCING GRIP.

974,159.  Specification of Letters Patent.  Patented Nov. 1, 1910.

Application filed April 16, 1910. Serial No. 555,792.

*To all whom it may concern:*

Be it known that I, ARTHUR KNODLE, a citizen of the United States, residing at Leaf River, in the county of Ogle and State of Illinois, have invented certain new and useful Improvements in Woven-Wire-Fencing Grips, of which the following is a specification, reference being had to the accompanying drawings.
My invention relates to improvements in gripping or clamping devices to engage woven wire, wire fencing or the like.

The object of the invention is to provide a simple and practical gripping device of this character which may be readily applied to and removed from woven wire fabric, and which will effectively hold the same while being stretched.

With the above and other objects in view, the invention consists of the novel construction, combination and arrangement of parts, hereinafter fully described and claimed, and illustrated in the accompanying drawings in which:—
Figure 1 is a perspective view illustrating the application of the invention; and Figs. 2 and 3 are longitudinal and transverse sectional views.

My improved grip or clamp comprises two rollers 1 preferably of cylindrical form and mounted eccentrically on pivots 2 which are rotatable in upper and lower connecting plates 3. Fixed concentrically on the projecting extremities of the upper pivots 2 are meshing cog gears 4, which latter cause the eccentric rollers 1 to rotate in unison and thereby cause them to act as cams to grip woven wire fencing fabric W between them. For the purpose of making the gripping action of these cam or eccentric rollers more effective, one or both of them may be provided with one or more longitudinal ribs, as indicated at 5. As illustrated, the rib 5 extends from end to end of one of the rollers and the latter are of such length as to receive a comparatively high or wide piece of fabric W. The cam or eccentric rollers are actuated to gripping position by providing on them adjacent their centers, radially projecting arms 6 which are connected to the ends of two short chains or other flexible elements 7, which latter are in turn hooked on to a ring or link 8 which may be connected to a wire stretching tool or machine.
The arms 6 are preferably constructed of I-bolts passed through the rollers so that the chains may be hooked into their eyes, and they are strengthened and reinforced by conical sleeves 9 having central openings to receive the bolts and enlarged concave base portions 10 shaped to fit the rollers.

From the foregoing it will be seen that the invention provides an exceedingly simple and inexpensive grip or cam which may be readily applied to various kinds and sizes of woven wire fencing fabric, and which when applied will tightly grip the same and render slipping impossible, the peculiar construction of the device causing the gripping action to increase as the pull on the fabric increases.

Having thus described the invention, what is claimed is:

1. A wire fence gripping device comprising a pair of end plates, a pair of gripping rollers disposed between and having their ends bearing against the opposing sides of said end plates, rods extending eccentrically through said gripping rollers and also through and having their bearings in said end plates, a pair of intermeshing gears secured on one end of said rods for rotation therewith and bearing against the outer side of one of said end plates, sleeves projecting radially from said gripping rollers, bolts extending diametrically through said rollers and longitudinally through said sleeves, said bolts having eyes at their outer ends, and bearing on the outer ends of said sleeves, said bolts securing said sleeves to the said gripping rollers and co-acting therewith to form arms for said rollers, and chains, for the purpose set forth, attached to the eyes of said bolts.

2. In a wire fencing gripping device of the class described, a gripping roller, an eye-bolt extending diametrically therethrough and a sleeve on one side of the gripping roller and through which the said eye-bolt extends, said eye-bolt securing said bracing sleeve to the said gripping roller and coacting therewith to form an operating arm for said roller.

In testimony whereof I hereunto affix my signature in the presence of two witnesses.

ARTHUR KNODLE.

Witnesses:
CHARLES H. KNODLE,
R. J. MYERS.